# United States Patent
Karlsson

[15] 3,667,584
[45] June 6, 1972

[54] TRANSPORT ROLLER

[72] Inventor: Bengt Sigvard Karlsson, Enskede, Sweden

[73] Assignee: Sandvikens Jernverks Aktiebolag, Sandviken, Sweden

[22] Filed: June 25, 1970

[21] Appl. No.: 49,855

[30] Foreign Application Priority Data

July 8, 1969 Sweden....................................9631/69

[52] U.S. Cl. ..............................................193/37, 29/121 A
[51] Int. Cl. ........................................................B65g 13/00
[58] Field of Search.......................301/43; 198/127; 193/37; 29/121 R, 121 A, 121 H

[56] References Cited

UNITED STATES PATENTS

| 1,815,716 | 7/1931 | Ker | 29/121 A |
| 3,325,880 | 6/1967 | Kotter et al. | 29/121 R |
| 3,038,587 | 6/1962 | Bilocq | 198/127 |
| 1,333,366 | 3/1920 | Anderson | 301/43 X |

Primary Examiner—Evon C. Blunk
Assistant Examiner—Hadd S. Lane
Attorney—Pierce, Scheffler & Parker

[57] ABSTRACT

For a transport roller useful in handling timber and similar bulky objects, the surface of a cylindrical roller of metal is provided with spaced rows of studs tipped with wear-resistant material. The studs are fixed to steel strips, which strips are welded or otherwise anchored to the surface of the roller, being disposed in a predetermined pattern thereover.

2 Claims, 6 Drawing Figures

PATENTED JUN 6 1972 3,667,584
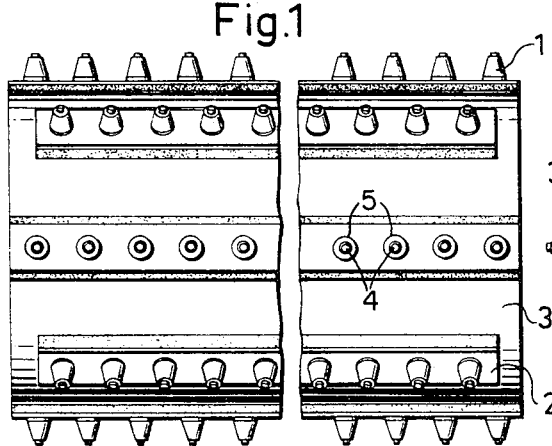
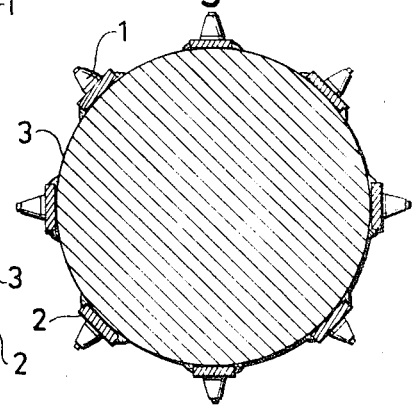
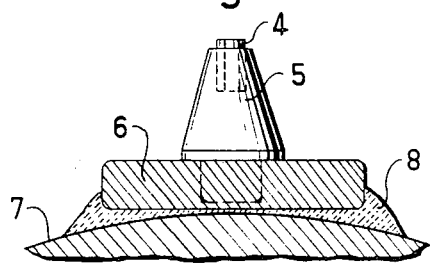
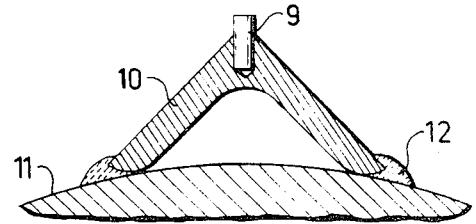
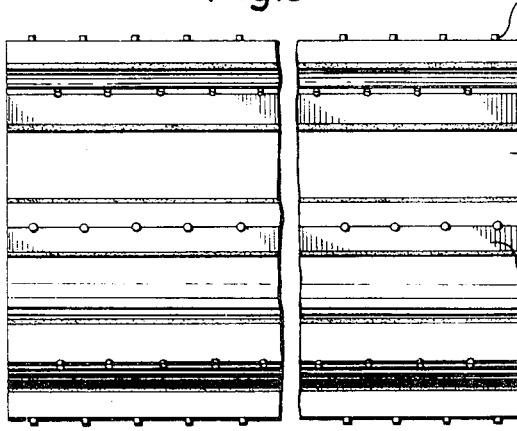
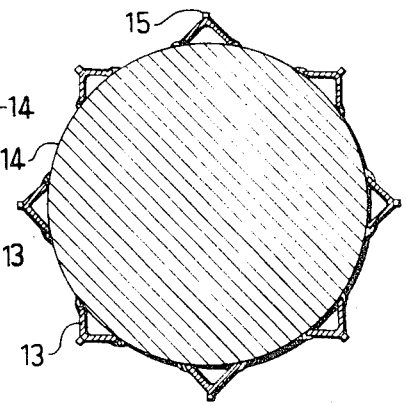

TRANSPORT ROLLER

The present invention relates to a transport roller and particularly to such rollers as are used for transport of timber, wood and similar heavy and bulky objects. The invention has method as well as apparatus aspects.

It heretofore had been proposed to provide grooves, studs or other projecting parts on the surfaces of such transport rollers, in order to facilitate the carriage of transport goods as for instance timber, logs or wooden objects of various kinds.

The rollers generally had been made completely of steel, but in more recent times have often been formed with a rigid central shaft and a jacket of rubber or similar material. During use, the transport device is exposed to conditions causing great wear of different parts of the rollers. Among measures which heretofore have been taken to minimize this wear, may be mentioned the provision of said embodiment with a rubber jacket.

With reference to the provision of studs attached to the rollers, corresponding measures have involved the use of harder and more wear-resistant materials — such for instance, as hard metal — in the tips of the studs. Such hard metal-tipped studs have in general been attached to the jacket of the roller individual by means of bolts, welded joints or by fastening with screws in threaded holes in the roller. In the case of rollers provided with a jacket of rubber, the studs which preferably have anchor flanges are generally fastened in radial holes or "pits" in the rubber jacket. Such hard metal-tipped studs have accounted for great advantages over earlier used grooves, pins and similar means of steel, because of increased reliability of service and higher transport capacity and life of the roller. In many cases, however, the fastening and replacement of such studs to the transport roller have been a troublesome and time-consuming work. Furthermore, the transport tracks are generally situated out of doors, which mean considerable maintenance costs.

The above-mentioned (and other) disadvantages have been reduced to a great extent by the present invention and a device has been made available which admits the fastening of a great number of studs similtaneously to the roller by means of a simple welding operation.

According to the present invention, a number of strips of steel (or similar material) are placed at a distance from each other along the jacket surface of the roller, preferably in its longitudinal direction. Furthermore, the strips have projecting studs or pins consisting wholly or partly of hard metal or other wear-resistant material. The hard metal pins are often attached directly to the strips by means of brazing, cementing, welding or in other ways, but the transport roller may also be furnished with strips and attached steel studs tipped with hard metal pins.

It is often been found advantageous, within the scope of the invention, to mount the strips on the transport rollers according to certain patterns. If, for example, the strips are mounted so that every second strip is displaced half a stud distance or division in relation to the rest, the number of so-called "engagement lines" can thus be doubled, thereby causing less wear of the steel roller. In the mentioned mode of mounting, the studs make a zigzag pattern and the strips are parallel with the axis of the roller. It is also advantageous to tilt the strips in relation to the axis, possibly with different angles, whereby it is made possible to steer the goods laterally. The strips should, in the latter case, be bent to form a spiral, following the cylinder surface of the roller. Sometimes it is suitable to mount the strips perpendicular to the axis and bend them to the same radius as the roller.

In transport rollers having a jacket of rubber or similar material it has been found advantageous to use the above described strips — so-called "stud strips" — being fastened to the transport roller by means of vulcanizing or similar mode of attachment. By this practice a better fastening of the studs to the rubber is secured than by individual fastening of every single stud.

The strips may have simple profiles, such for instance as flat iron or angle iron, which form means low manufacturing costs. Furthermore, it has been found advantageous to supply the strips in normal lengths having standard measures. The fastening of the strips to the roller may, as mentioned, be made by welding. It has been found that sufficient mechanical strength of the connection can be obtained by a few so-called "tack welds" between strip and transport roller.

The hard metal pins, which are usually fastened directly to the strips or to the tips of separate steel studs, preferably have the shape of tubes. Such tubular (and also solid) pins normally have plane end surfaces. It has been found that the shape of such surfaces can be maintained during a long period of use when the pins are made of cemented tungsten carbide or similar wear-resistant material. By these means, only a small penetration of bark and a little deformation of the sapwood has been found in comparison with the situation when using conventional types of transport rollers having pointed teeth or studs of steel or similar material.

The invention will now be described in greater particularity, and with reference to the accompanying drawing, in which FIGS. 1, 2 and 3 respectively, 4, 5 and 6 show two different embodiments of a transport roller according to the invention. FIGS. 1 and 2 show, in side elevation and end elevation, respectively, a transport roller having stud strips seen side-face respectively in transverse section. FIG. 3 shows more in detail the design and the fastening of the hard metal-tipped stud of the device in FIG. 1 and FIG. 2.

As seen from FIGS. 1 and 2, the studs 1 are anchored in strips 2, attached to the cylinder surface of the roller 3. In FIG. 1 also, it is shown that the strips, as often is the case, are mounted on the roller so that every second strip is displaced half a stud distance in relation to the rest. As indicated in FIG. 1, the hard metal inserts 4 carried by studs 5 may have the form of tubular pins, as indicated in the horizontally vertically disposed strip member shown in FIG. 1. From FIG. 3 it is seen that a hard metal pin 4 is attached to a steel stud 5. The pin 4 is fastened to stud 5 by means of brazing or similar technique. The steel stud 5 is likewise anchored to the strip 6 by means of welding, brazing or similar.

In this example, the strip 6 is attached to a cylinder surface 7 of the roller by means of welded joints 8. In case the transport roller has a jacket or coat of rubber, the strip 6 may be attached to the jacket surface 7 by means of vulcanization or similar process.

FIGS. 5 and 6 show (in side elevation and end elevation, respectively) a transport roller having a somewhat different kind of stud-strip. FIG. 4 shows a transverse section of a stud-strip according to the mentioned embodiment. As is seen from FIG. 4, the studs consist of hard metal pins 9, brazed to the strips 10 built of so-called uniformly flanged angle iron. The stud-strips 10 are in turn secured with the cylinder surface 11 of the roller by means of welded joints 12.

In FIGS. 5 and 6 is shown how stud-strips 13, according to the mentioned type, are distributed over the jacket surface 14 of the roller. Also in this case, it has been found suitable to mount the strips 13 so that the studs 15 make a zigzag pattern.

Finally, it may be emphasized that the conception "hard metal" used above means principally sintered hard alloys, which besides one or more carbides of the group comprising WC, TiC, TaC and/or NbC, also contain a binder metal such as Co, Ni and/or Fe.

I claim:

1. Transport roller for transport of timber and similar bulky objects, which comprises a cylindrical roller of metal, and
   a number of spaced strips of steel attached by welds along the surface of the roller, and
   on each of the strips a plurality of projecting members, each projecting member consisting of a metallic stud embracing an insert of hard metal, one end of said insert extending outwardly from the free outer end of said stud.

2. Transport roller as defined in claim 1, wherein the hard metal inserts have plane end surfaces and consist of tubular pins.

* * * * *